United States Patent [19]

Lyon et al.

[11] Patent Number: 5,255,041
[45] Date of Patent: Oct. 19, 1993

[54] SINGLE-USE CAMERA WITH DOOR FOR CARTRIDGE RECEIVING CHAMBER

[75] Inventors: Ralph M. Lyon; Mark A. Lamphron, both of Rochester, N.Y.

[73] Assignee: Eastman Kodak Company, Rochester, N.Y.

[21] Appl. No.: 16,389

[22] Filed: Feb. 11, 1993

[51] Int. Cl.⁵ .............................................. G03B 17/02
[52] U.S. Cl. .................................................... 354/288
[58] Field of Search ......................................... 354/288

[56] References Cited

U.S. PATENT DOCUMENTS

| | | | |
|---|---|---|---|
| 3,648,582 | 3/1972 | Nerwin | 95/11 R |
| 3,672,279 | 6/1972 | Hackenberg et al. | 95/31 R |
| 4,312,584 | 1/1982 | Lee | 354/266 |
| 4,329,037 | 5/1982 | Caviness | 354/187 |
| 4,641,936 | 2/1987 | Harvey et al. | 354/212 |
| 4,666,274 | 5/1987 | Maeno et al. | 354/64 |
| 4,668,070 | 5/1987 | Wakabayashi et al. | 354/484 |
| 4,751,536 | 6/1988 | Ohmura et al. | 354/75 |
| 4,797,697 | 1/1989 | Heuer et al. | 354/75 |
| 4,896,178 | 1/1990 | Ohmura et al. | 354/145.1 |
| 5,063,400 | 11/1991 | Takei et al. | 354/288 |
| 5,103,249 | 4/1992 | Keene | 354/85 |

FOREIGN PATENT DOCUMENTS 57-150837  9/1982  Japan.
3-167538  7/1991  Japan.

*Primary Examiner*—Michael L. Gellner
*Assistant Examiner*—Nicholas J. Tuccillo
*Attorney, Agent, or Firm*—Roger A. Fields

[57] ABSTRACT

A single-use camera comprises an exterior decorative cardboard casing having an open end, and a plastic light-tight camera housing arranged partly inside the exterior casing and having an end portion with a film cartridge receiving chamber located outside the exterior casing. According to the invention, the end portion of the camera housing includes chamber covering means supported for opening movement to undercover the cartridge receiving chamber without being obstructed by the exterior casing, whereby a film cartridge may be removed from the cartridge receiving chamber without first tearing the exterior casing off the camera housing.

4 Claims, 1 Drawing Sheet

SINGLE-USE CAMERA WITH DOOR FOR CARTRIDGE RECEIVING CHAMBER

CROSS-REFERENCE TO RELATED APPLICATION(S)

Reference is made to commonly assigned copending application Ser. No. 08/016,400 entitled SINGLE-USE CAMERA WITH REMOVABLE END PORTION FOR CARTRIDGE ACCESS, and filed Feb. 11, 1991 in the names Ralph Merwin Lyon and William Harvey Goddard.

BACKGROUND OF THE INVENTION

1. Field of the Invention

The invention relates generally to the field of photography, and in particular to single-use cameras.

2. Description of the Prior Art 35 mm film and cameras that are all in one, commonly referred to as "single-use cameras", have become well known recently Each single-use camera is a point and shoot type and it comprises a plastic light-tight camera housing, including a film cartridge receiving chamber, and an exterior decorative cardboard casing which snugly contains the camera housing. At the manufacturer, the cartridge receiving chamber is loaded with a 35 mm film cartridge and substantially the entire length of the unexposed filmstrip is factory prewound from the film cartridge into a film supply chamber of the camera housing After the user takes a picture, a thumbwheel is manually rotated to rewind the exposed frame into the film cartridge. The rewinding movement of the filmstrip the equivalent of one frame rotates a metering sprocket to decrement an exposure counter to its next lower number setting When the entire length of the filmstrip is exposed and rewound into the film cartridge, the single-use camera is given to a photofinisher who tears the exterior casing off the camera housing, breaks open the camera housing, and removes the film cartridge from the cartridge receiving chamber Then, the film cartridge is broken open and the exposed filmstrip is withdrawn for processing. The unbroken parts of the single-use camera may be recycled.

Prior at U.S. Pat. No. 4,890,130, issued Dec. 26, 1989, discloses a single-sue camera in which a plastic light-tight camera housing includes a break open part of a rear or bottom wall of the housing or a hinged door at the bottom wall which are opened to access a film cartridge in a cartridge receiving chamber of the housing. An exterior decorative cardboard casing which covers the break open part or the hinged door must be torn out of the way of the break open part or the hinged door before it is opened.

Recently, a single-use camera with the product name "Konica MINI" was announced in Japan. The Konica MINI comprises an exterior decorative cardboard casing having an open end, and a plastic light-tight camera housing arranged partly inside the exterior casing and having an end portion with a cartridge receiving chamber located outside the exterior casing. Locating the end portion with the cartridge receiving chamber outside the exterior casing permits the remainder of the camera housing to be made relatively thin since the film cartridge is the thickest component and the exterior casing must snugly contain the camera housing. If the exterior casing covered the end portion as in U.S. Pat. No. 4,890,130, the remainder of the camera housing would likely have to be thickened to conform with the end portion. To remove the film cartridge from the cartridge receiving chamber, a rear wall of the camera housing is disconnected from the remainder of the housing. Consequently, the exterior casing must first be torn off the camera housing.

Problem to be Solved by the Invention

In U.S Pat. No. 4,890,130 and the Konica MINI, the exterior decorative cardboard casing must be torn off the plastic light-tight camera housing before breaking open the camera housing to remove a film cartridge from a cartridge receiving chamber in the housing.

SUMMARY OF THE INVENTION

According to the invention, a single-use camera comprising an exterior decorative cardboard casing having an open end, and a plastic light-tight camera housing arranged partly inside the exterior casing and having an end portion with a film cartridge receiving chamber located outside the exterior casing, is characterized in that:

the end portion of the camera housing includes chamber covering means supported for opening movement to uncover the cartridge receiving chamber without being obstructed by the exterior casing, whereby a film cartridge may be removed from the cartridge receiving chamber without first taking the exterior casing off the camera housing.

DETAILED DESCRIPTION OF THE PREFERRED EMBODIMENT

Figure 1:
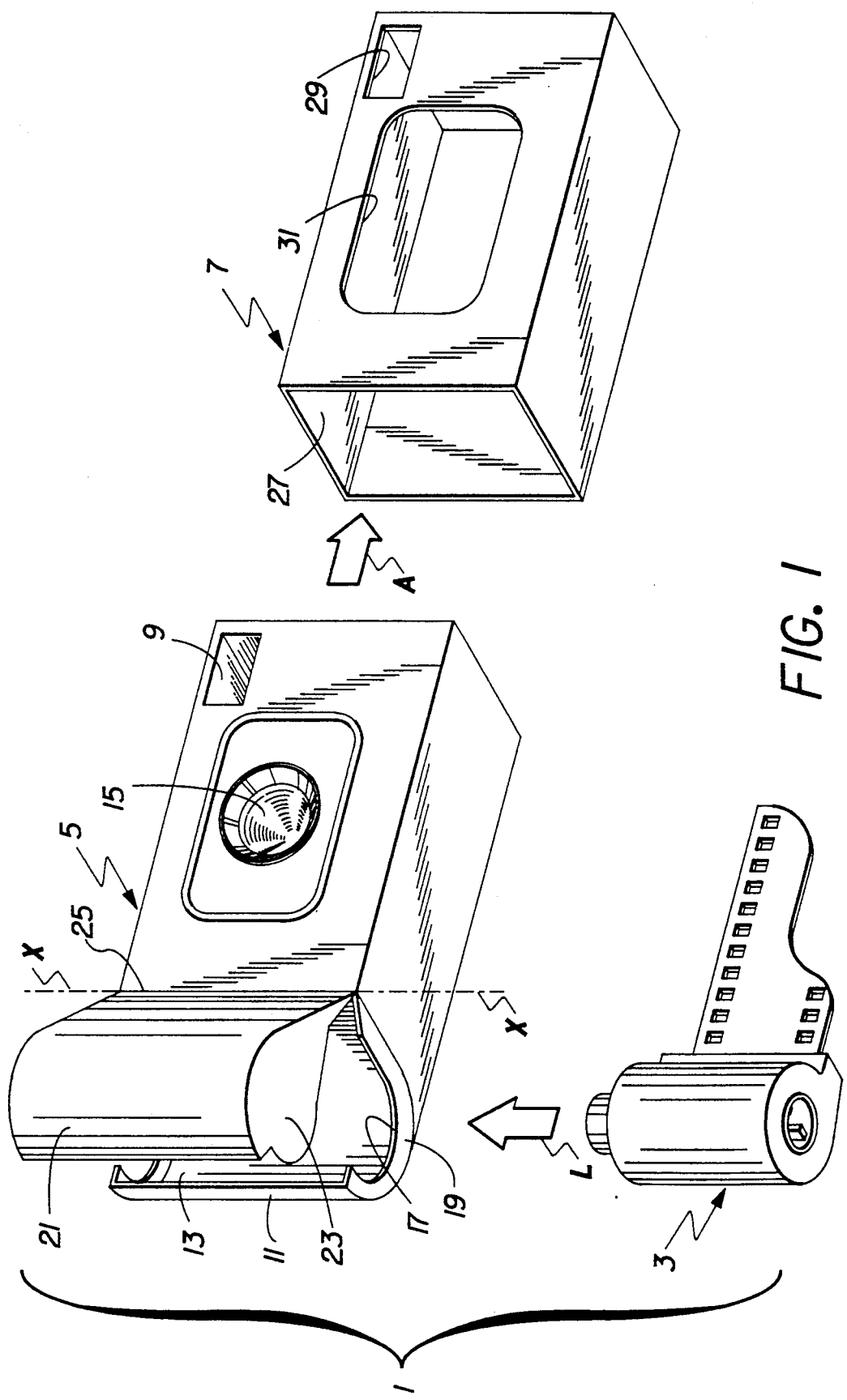
FIG. 1 is an exploded perspective view of a single-use camera according to a preferred embodiment of the invention.

The invention is disclosed as being embodied preferably in a 35 mm single-use camera. Because the features of a single-use camera are generally known, this description is directed in particular only to camera elements forming part of or cooperating directly with the invention. It is to be understood, however, that other elements not specifically shown or described may take various forms known to persons of ordinary skill in the art.

Referring now to the drawing, FIG. 1 shows a 35 mm single-use camera 1 comprising a conventional 35 mm film cartridge 3, a plastic light-tight camera housing 5, and an exterior decorative cardboard casing 7.

The camera housing 5 includes a direct see-through viewfinder tunnel 9 and a rounded end portion 11 defining an interior cartridge receiving chamber 13. A fixed focus taking lens 15 is secured to the camera housing 5. The chamber 13 has an entry opening 17 in a bottom wall section 19 of the end portion 11 for admitting the cartridge 3 endwise, i.e. end first, into the chamber in a loading direction indicated by the arrow L. A door 21 for sealing the chamber 13 forms a curved front wall of the end portion 11 and has an integral bottom lid 23 shaped to cover the entry opening 17 when the door is closed. The door 21 is connected to the end portion 11 via a living hinge 25 for opening movement about a hinge axis X extending parallel to the loading direction L.

The exterior casing 7 is dimensioned to receive the camera housing 5 except for its end portion 11, through an open end 27 of the casing in the direction indicated by the arrow A, to snugly partly contain the housing. The exterior casing 7 has respective openings 29 and 31 for the viewfinder tunnel 9 and the taking lens 15. The end portion 11 is located outside the exterior casing 7 at the open end 31 to allow the door 21 to be opened to uncover the chamber 13 without being obstructed by the exterior casing. Consequently, the cartridge 3 can be removed from the chamber 13 without first tearing the exterior casing 7 off the camera housing 5.

The invention has been described with reference to a preferred embodiment. However, it will be appreciated that modifications and variations can be effected by persons of ordinary skill in the art without departing from the scope of the invention. For example, the door 21 can be supported for opening movement by a sliding motion rather than a pivotal motion.

We claim:

1. A single-use camera comprising an exterior decorative cardboard casing having an open end, and a plastic light-tight camera housing arranged partly inside said exterior casing and having an end portion with a film cartridge receiving chamber located outside the exterior casing, is characterized in that:

said end portion of the camera housing includes chamber covering means supported for opening movement to uncover said cartridge receiving chamber without being obstructed by said exterior casing, whereby a film cartridge may be removed from said cartridge receiving chamber without first taking said exterior casing off said camera housing.

2. A single-use camera as recited in claim 1, wherein said cartridge receiving chamber has an entry opening in a bottom wall of said end portion of the camera housing for admitting a film cartridge endwise into the cartridge receiving chamber in a predetermined direction, and said chamber covering means includes a door with a hinge axis extending parallel to said predetermined direction and having an integral bottom lid shaped to cover said entry opening.

3. A single-use camera as recited in claim 2, wherein said door forms a front wall of said end portion of the camera housing supported for opening movement outwardly away from said cartridge receiving chamber to uncover the cartridge receiving chamber.

4. A single-use camera as recited in claim 1, wherein said chamber covering means includes a front wall of said end portion of the camera housing supported for opening movement along a hinge axis adjacent said open end of the exterior casing.

* * * * *